(12) United States Patent
Demeschkin

(10) Patent No.: US 12,337,999 B2
(45) Date of Patent: Jun. 24, 2025

(54) METHOD AND COMPUTER PROGRAM PRODUCT FOR MONITORING A BLEED AIR SUPPLY SYSTEM OF AN AIRCRAFT

(71) Applicant: Lufthansa Technik AG, Hamburg (DE)

(72) Inventor: Alexej Demeschkin, Mainz (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 176 days.

(21) Appl. No.: 17/789,800

(22) PCT Filed: Dec. 28, 2020

(86) PCT No.: PCT/EP2020/087899
§ 371 (c)(1),
(2) Date: Jun. 29, 2022

(87) PCT Pub. No.: WO2021/136750
PCT Pub. Date: Jul. 8, 2021

(65) Prior Publication Data
US 2023/0037115 A1     Feb. 2, 2023

(30) Foreign Application Priority Data

Jan. 2, 2020  (EP) .................................. 20150031

(51) Int. Cl.
*F02C 6/08*       (2006.01)
*B64D 13/02*   (2006.01)
(Continued)

(52) U.S. Cl.
CPC .............. *B64F 5/60* (2017.01); *B64D 13/02* (2013.01); *F02C 6/08* (2013.01); *F02C 9/18* (2013.01); *B64D 2045/0085* (2013.01)

(58) Field of Classification Search
CPC ..................................... F02C 9/18; F02C 6/08
See application file for complete search history.

(56) References Cited

U.S. PATENT DOCUMENTS 6,502,085 B1 * 12/2002 Adibhatla ............. G01M 15/00
706/20
9,555,903 B2    1/2017 Howard
(Continued)

FOREIGN PATENT DOCUMENTS

FR        2978123 A1    1/2013
JP      2009511338 A    3/2009

*Primary Examiner* — Thuyhang N Nguyen
(74) *Attorney, Agent, or Firm* — Leydig, Voit & Mayer, Ltd.

(57) ABSTRACT

A bleed air supply system has a sensor monitoring the system, an operating condition monitor detecting an operating condition value of the aircraft (other than the bleed air supply system), and independent monitoring modules evaluating a part of the bleed air supply system. The monitoring modules each have an individual monitoring function and individual activation and deactivation parameters based on sensor data and the operating condition value. The method includes: detecting the condition of the bleed air supply system via sensor data and the operating condition value; activating a monitoring module, which has activation parameters met by the sensor data and the operating condition value; monitoring the condition of the bleed air supply system by the activated monitoring module by a monitoring function of the activated monitoring module; and deactivating the activated monitoring module, deactivation parameters of which are met by the sensor data and the operating condition value.

14 Claims, 3 Drawing Sheets

(51) Int. Cl.
*B64F 5/60* (2017.01)
*F02C 9/18* (2006.01)
*B64D 45/00* (2006.01)

(56) References Cited

U.S. PATENT DOCUMENTS

| | | |
|---|---|---|
| 2009/0235670 A1 | 9/2009 | Rostek et al. |
| 2010/0147399 A1 | 6/2010 | Buhring |
| 2013/0104516 A1* | 5/2013 | Varillas .................... F02C 9/18 |
| | | 60/39.24 |
| 2013/0131951 A1* | 5/2013 | Pandey .................. F01D 5/141 |
| | | 701/100 |
| 2013/0345908 A1 | 12/2013 | Dorr et al. |
| 2014/0250898 A1* | 9/2014 | Mackin .................. F02C 7/047 |
| | | 60/785 |
| 2014/0309846 A1 | 10/2014 | Howard |
| 2014/0336872 A1* | 11/2014 | Howard .................... B64F 5/60 |
| | | 701/33.7 |
| 2016/0326878 A1* | 11/2016 | Morimoto ................ F02C 7/18 |
| 2017/0183085 A1 | 6/2017 | Branthomme et al. |
| 2017/0254216 A1* | 9/2017 | Adibhatla ................ F02C 6/08 |
| 2017/0321570 A1* | 11/2017 | Scothern ............... F01D 21/003 |
| 2018/0314278 A1 | 11/2018 | Vickers et al. |
| 2019/0039739 A1 | 2/2019 | Winter et al. |
| 2019/0285324 A1 | 9/2019 | Valiquette et al. |

* cited by examiner

METHOD AND COMPUTER PROGRAM PRODUCT FOR MONITORING A BLEED AIR SUPPLY SYSTEM OF AN AIRCRAFT

CROSS REFERENCE TO RELATED APPLICATIONS

This application is a U.S. National Phase application under 35 U.S.C. § 371 of International Application No. PCT/EP2020/087899, filed on Dec. 28, 2020, and claims benefit to European Patent Application No. 20150031.1, filed on Jan. 2, 2020. The International Application was published in German on Jul. 8, 2021 as WO 2021/136750 A1 under PCT Article 21(2).

FIELD

The present disclosure relates to a method and a computer program product for monitoring a bleed air supply system of an aircraft.

BACKGROUND

In aircraft, in particular commercial aircraft, compressed air is bled out of the turbo compressor of an engine to be able to generate or maintain a desired pressure in a pressurized cabin or in pneumatic systems of the aircraft. The engines can be jet engines, propeller turbines, or auxiliary power units (APUs). It is typical that each engine of an aircraft is equipped with a separate bleed air supply system, inter alia, also to ensure a redundancy.

The bleed air is taken from an engine by a bleed air supply system and fed to the various consumers. In this case, in addition to heavily compressed and thus hot bleed air, air with little compression, which is thus significantly cooler in comparison, is generally also taken from an engine at another location in order to be able to cool the bleed air, which is heated upon compression, to a desired temperature in a heat exchanger.

The bleed air supply system has various actuators, in particular controllable or self-regulating valves, pressure and temperature sensors or transducers, and possibly a control unit, which can actuate the actuators as a function of the determined pressure and temperature values, and possibly external control signals. It is also possible to dispense with a control unit, wherein then solely pneumatic regulation of the individual actuators can be implemented. In both cases, in addition to maintaining a desired operating pressure, the temperature of the compressed air provided to the various consumers can in principle also be regulated.

Bleed air supply systems have a low level of reliability due to the many mechanical components, in particular in the case of solely pneumatic regulation. Upon occurrence of a fault, the bleed air supply system is in principle to be switched off for reasons of safety, even if the frequent failures can sometimes cause significant disturbances in the operation of an aircraft, in particular a commercial aircraft.

To be able to recognize faults of a bleed air supply system during a flight, the values determined by the pressure and temperature sensors of the bleed air supply system may be monitored, wherein generally only a check with respect to predefined threshold values takes place in the prior art. If a threshold value is exceeded by a measured value in such a system, the entire bleed air supply system is deactivated as a precaution.

Although this monitoring of the bleed air supply system is capable of recognizing possible faults in the bleed air supply system and deactivating the system if needed, the monitoring devices do not provide detailed items of information in the fault messages on the possible cause of a fault of the bleed air supply system, so that a fault generally requires complex troubleshooting and repair measures.

The deactivation of bleed air supply systems in the event of faults additionally has the disadvantage that upon deactivation of one system, the further bleed air supply system(s) of the aircraft additionally have to provide the bleed air of the deactivated bleed air supply system, which increases the wear and also the risk of failure of the further bleed air supply systems.

A method for diagnosing faults of the bleed air supply system is described in document U.S. Pat. No. 9,555,903 B2, in which diverse sensors arranged on the bleed air supply system are read out and the respective sensor data are checked for deviations from comparison values. The comparison values can be fixedly predefined values, parameters determined from operating parameters of the engine and the associated bleed air supply system, (average) values determined in the past for the bleed air supply system in question, or average values determined in the past for all bleed air supply systems of a construction series.

The interpretation of possibly established deviations can take place by flight phase here, thus, for example, separately for the takeoff, ascent, descent, and cruising flight phases. In individual cases, determined deviations of the sensor values from the comparison values in predefined flight phases can then possibly be assigned to specific faults of the bleed air supply system. In contrast, for example, an excessively low pressure in the ascent or cruising flight phase actually cannot be uniquely assigned to one component or at least can be uniquely assigned to a small group of components. At least in a part of the fault messages, no actual restriction of the possibly faulty components of the bleed air supply system takes place even in the method according to U.S. Pat. No. 9,555,903 B2, whereby the troubleshooting is very complex in such a case of fault.

SUMMARY

In an embodiment, the present disclosure provides a method that monitors a bleed air supply system of an aircraft. The bleed air supply system has: at least one sensor for condition monitoring of the bleed air supply system on the basis of sensor data, at least one operating condition monitor for detecting an operating condition of the aircraft with an exception of the bleed air supply system via at least one operating condition value, and at least two independent monitoring modules for evaluating a condition of at least a part of the bleed air supply system, wherein for each of the monitoring modules, an individual monitoring function and individual activation and deactivation parameters based on the sensor data of the at least one sensor and the at least one operating condition value are provided. The method includes: detecting the condition of the bleed air supply system via the sensor data and the operating condition of the aircraft via the at least one operating condition value; activating a monitoring module of the monitoring modules, the activation parameters of which are met by the sensor data and the at least one operating condition value; monitoring the condition of the bleed air supply system by way of the activated monitoring module by a monitoring function of the activated monitoring module; and deactivating the activated monitoring module, deactivation parameters of which are met by the sensor data and the at least one operating condition value.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
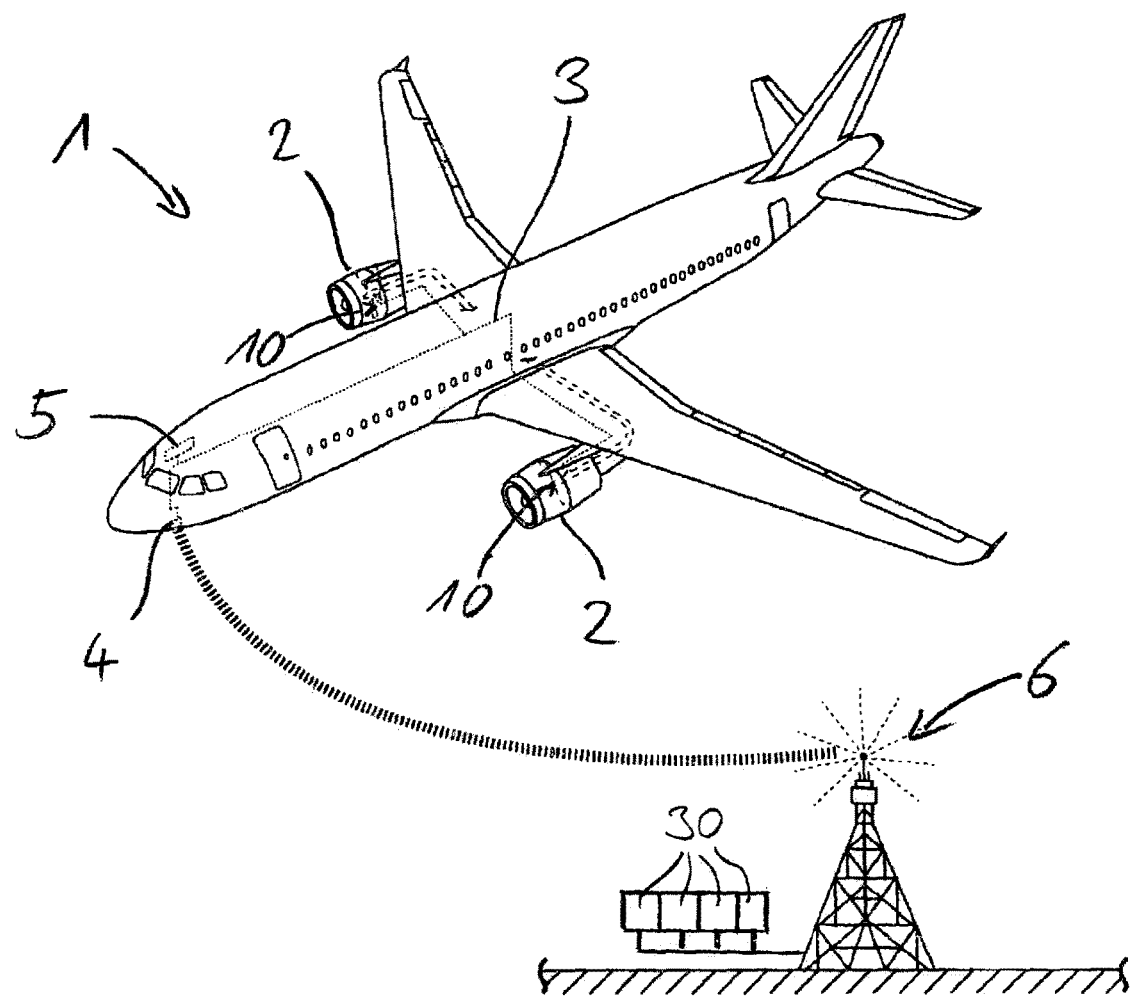
FIG. 1 shows an aircraft designed for carrying out the method according to the present disclosure.

In an embodiment, the present disclosure provides a method and a computer program product for monitoring a bleed air supply system of an aircraft, which is improved over the prior art, for example, in that a more accurate error diagnosis is made possible with regard to the point in time at which an error occurs, and/or the identification of the component at which an error occurs.

The present disclosure relates to a method for monitoring a bleed air supply system of an aircraft having at least one sensor for condition monitoring of the bleed air supply system on the basis of the sensor data, at least one operating condition monitor for detecting the operating condition of the aircraft with the exception of the bleed air supply system via at least one operating condition value, and at least two independent monitoring modules for evaluating the condition of at least a part of the bleed air supply system on the basis of a monitoring function, wherein for each monitoring module, an individual monitoring function and individual activation and deactivation parameters based on sensor data of at least one sensor and at least one operating condition value are provided, having the following steps:

- detecting the condition of the bleed air supply system via the sensor data and the operating condition of the aircraft via the at least one operating condition value;
- activating a monitoring module, the activation parameters of which are met by the sensor data and the at least one operating condition value;
- monitoring the condition of at least a part of the bleed air supply system by the activated monitoring module on the basis of its monitoring function; and
- deactivating an activated monitoring module, the deactivation parameters of which are met by the sensor data and at least one operating condition value.

Furthermore, the present disclosure relates to a computer program product or set of computer program products comprising program parts which, when loaded in a computer or in computers networked with one another, are designed for carrying out the method according to an aspect of the present disclosure.

The method according to an aspect of the present disclosure is based, on the one hand, on the sensor data which are provided by the at least one sensor and are suitable for condition monitoring of the bleed air supply system at least in the region of the respective sensor. In general, a plurality of sensors, for example, pressure sensors and temperature sensors, is provided distributed over the bleed air system to detect the respective variables at different points of the system. It is also possible to provide transducers, using which the current positions of actuators of the bleed air supply system can be detected.

On the other hand, at least one operating condition value is taken into consideration, which supplies items of information about the operating condition of the aircraft, but not of the bleed air supply system. The operating condition value is a technical variable which reflects the condition of a technical device of the aircraft, for example, the landing gear position or the thrust lever position, operating values of technical devices, for example, a pressure inside the engine, or condition values of the aircraft or the surroundings, for example, internal pressure in the aircraft cabin or external temperature. The at least one operating condition value, but in general a large number of operating condition values, are provided by an operating condition monitor which can also be, for example, the onboard computer or the electronic monitoring system of the aircraft.

Of course, it is possible that operating condition values and the sensor data for condition monitoring of the bleed air supply system are detected and/or determined by a single system of the aircraft and are provided as a uniform set of input variables to the method according to an aspect of the present disclosure. However, even in this case the input variables may be logically divided into sensor data for condition monitoring of the bleed air supply system and operating condition values of the aircraft with the exception of the bleed air supply system.

The method according to the present disclosure is distinguished in that at least two independent monitoring modules are provided for evaluating the condition of at least a part of the bleed air supply system, wherein an individual monitoring function and individual activation and deactivation parameters based on sensor data of at least one sensor and at least one operating condition value are provided for each monitoring module. The monitoring modules may thus be activated and deactivated completely independently of one another, to also monitor the condition of the bleed air supply system or a part thereof independently of one another. The latter is ensured in particular by the individual monitoring functions which—in contrast to a homogeneous redundancy—are not identical in any case.

When activated, a monitoring module can monitor the condition of the entire bleed air supply system or only a part thereof with the aid of its monitoring function on the basis of all sensor data or at least those sensor data relating to that part of the bleed air supply system for the monitoring of which the module or its monitoring function is designed.

This is because aspects of the present disclosure recognize that a bleed air supply system, on the one hand, is a sufficiently complex system, the overall monitoring of which is often difficult, but on the other hand, the bleed air supply system may generally be divided into subsystems, the respective conditions of which—and individual functions of the subsystems resulting therefrom—may be monitored well independently of one another. Typical bleed air supply systems may thus generally be divided into subsystems or parts such as pressure regulator valve (PRV), high-pressure valve (HPV), temperature regulation system, possibly including a supply air valve. The valve subsystems may generally be monitored here, for example, by suitably arranged pressure sensors and valve position transducers, while temperature sensors and possibly a valve position transducer for a supply air valve can be provided for the cooling system.

It can therefore be advantageous if a provided monitoring module is designed to evaluate the condition of a part of the bleed air supply system, the condition of which is not evaluated by a further provided monitoring module. The monitoring function of the first-mentioned monitoring module may thus be tailored in particular to just that part of the bleed air supply system which is not also monitored by the other monitoring module. It is thus possible to provide a number of monitoring modules tailored to specific parts of the bleed air supply system, which can in principle be operated in parallel to one another, to thus ensure monitoring of the entire bleed air supply system. The parts monitored by the individual monitoring modules can also partially overlap here.

Since the individual monitoring modules do not monitor the bleed air supply system in its entire complexity, but rather in each case only parts thereof, the complexity of the respective monitoring function is accordingly also generally lower. This in turn has positive effects on the reliability of the monitoring of the bleed air supply system as a whole and in particular enables an accurate assignment of possible faults to faulty subsystems or even to worn or faulty system components. This is because if a fault is established solely by a monitoring module monitoring only a part of the bleed air supply system, it is generally to be presumed that the fault has occurred in the corresponding monitored part of the bleed air supply system, which facilitates the subsequent fault repair.

The provision of at least two monitoring modules (in general significantly more), which can each be activated and deactivated individually on the basis of suitable specifications relating not only to the sensor data, but also the operating condition values, offers further advantages.

In that in the activation and deactivation of the monitoring modules, in addition to the sensor data, the operating condition values of the aircraft are also taken into consideration, it is ensured that a monitoring module is only activated when its monitoring function is designed suitably for the actual operating condition of the aircraft or the condition of the bleed air supply system readable from the sensor data. The activation and deactivation of each monitoring module may be defined separately, so that, for example, multiple monitoring modules are provided for monitoring for a specific part of the bleed air supply system, which are activated due to deviating activation and deactivation parameters in different operating conditions, however. It is to be noted here that due to the combination of sensor data of at least one sensor and at least one operating condition value, a condition-dependent activation of the individual monitoring modules is possible, the degree of detail of which already at the outset goes beyond the division into flight phases known from the prior art. Of course, this applies all the more the more sensors and/or operating condition values are taken into consideration in the activation and/or deactivation.

It is obviously possible and in general also desirable to combine the two described advantageous benefits of the provision of multiple monitoring modules. As a result, it is preferred if at least three monitoring modules are provided, of which one of the monitoring modules is designed to evaluate the condition of a part of the bleed air supply system, the condition of which is not evaluated by another monitoring module, and of which two monitoring modules are designed for condition monitoring of at least partially overlapping parts of the bleed air supply system, but have deviating activation and deactivation parameters. The number of the monitoring modules may be expanded arbitrarily to thus implement any desired monitoring function for the bleed air supply system or arbitrary parts thereof in arbitrary conditions of the bleed air supply system and/or the aircraft.

It is to be noted again that due to the focusing possible according to the present disclosure of a monitoring module or its monitoring function on a specific part of the bleed air supply system and/or a specific operating condition of the overall system of the aircraft including the bleed air supply system, a monitoring function of comprehensible complexity is enabled, which as a result is generally significantly more reliable than a single complex monitoring function for the entire bleed air supply system and all operating conditions, as is attempted in the prior art.

The deactivation parameters of a monitoring module can in principle correspond to the activation parameters thereof, whereby the monitoring module is activated upon reaching a specific condition defined by the activation parameters and is deactivated again upon leaving just this condition. It can thus be ensured that the monitoring module is actually only active in the operating mode of aircraft and bleed air supply system, for which its monitoring function is designed.

It is possible that the activation parameters of a monitoring module comprise a time delay parameter to activate a monitoring module only after a predetermined time after the activation parameters are met. In this case, the monitoring module, after the activation parameters based on the sensor data and the at least one operating condition value are met, is not activated immediately, but rather only after passage of the time predefined by the time delay parameter. Due to this time delay in the activation, transient effects in the event of a change of the operating mode of aircraft and/or bleed air supply system, which in principle result in the activation of a monitoring module, can be excluded from the monitoring by just this monitoring module to avoid, for example, a false-positive fault message. In that transient effects can be excluded from the monitoring by a monitoring module, the monitoring function of such a monitoring module does not have to be oriented to the consideration of transient effects, whereby a low complexity of the monitoring function is often possible.

It is also possible that the deactivation parameters of a monitoring module comprise a duration parameter to deactivate a monitoring module after passage of a predefined duration after its activation. The deactivation can take place independently of a deactivation on the basis of sensor data and the at least one operating condition value. By way of the deactivation of a monitoring module via a duration parameter, a monitoring module can be provided for the chronologically limited monitoring of predefined changes of the operating mode of aircraft and/or bleed air supply system, wherein the end of the transient change of the sensor data and/or the at least one operating condition value may not be read from the sensor data or the at least one operating condition value itself.

It is preferred if a monitoring module or its monitoring function is designed to compare the detected sensor data to historic sensor data recorded during preceding activations of the monitoring module. By way of the comparison to corresponding historic data, changes of the monitored part of the bleed air supply system may be determined, which can indicate possible malfunctions in the monitored part of the bleed air supply system. It is ensured on the basis of the activation and deactivation parameters of the monitoring module that the comparison of the sensor data only takes place to historic sensor data which were recorded in the condition of aircraft and bleed air supply system for which the monitoring module is designed.

It is preferred if a monitoring module or its monitoring function is designed for determining minimum, maximum, average and/or variance values of the sensor data of at least one sensor or other aggregation values over an activation time period between activation and subsequent deactivation. The corresponding values can be taken into consideration during subsequent monitoring actions by the monitoring module to identify possibly occurring malfunctions. Thus, for example, a variance of the sensor data which is strongly increased in relation to historic values can indicate an (imminent) malfunction of the part of the bleed air supply system monitored by the monitoring module or of the entire bleed air supply system.

It is preferred if at least one monitoring module is designed to monitor at least a part of the sensors, namely to monitor the sensors for functionality. Erroneous sensor data can be recognized by a corresponding monitoring module, which would otherwise possibly be interpreted by the other monitoring modules as an indication of a malfunction of the parts of the bleed air supply system monitored by these monitoring modules.

The monitoring modules can be arranged directly on board the aircraft. However, it is preferred to arrange the monitoring modules outside the aircraft, wherein the sensor data and the at least one operating condition value are transmitted from the aircraft to the external monitoring modules. A continuous transmission of the data in question for real-time monitoring by the monitoring modules can be provided. However, it is also possible for the data in question to be recorded on board the aircraft and transmitted with a time delay to the monitoring modules. For example, after each landing, the data recorded over the preceding flight can be transmitted to the monitoring modules. The data recorded on board the aircraft can also be read out in a wired manner in the context of a service or removed in the form of a removable storage medium.

Independently of whether the monitoring modules are arranged on board the aircraft or outside thereof, those monitoring modules provided for real-time monitoring are preferably designed to output a warning if the monitoring function of a monitoring module recognizes a fault. The corresponding monitoring modules can also be designed to deactivate a bleed air supply system in the event of a fault classified as severe by the monitoring function, if the bleed air supply remains ensured by another redundant bleed air system.

Alternatively or additionally, the monitoring modules are designed to carry out predictive methods and also output a warning if needed. In predictive methods, changes of the sensor data of the part of the bleed air supply system monitored by a monitoring module are observed over time, which themselves possibly do not indicate an immediate fault, but can indicate that a fault is immediately imminent. If this is established accordingly, a warning can be output. The affected part of the bleed air supply system can then be serviced as a precaution before an actual fault of the bleed air supply system occurs accompanied by a failure of the bleed air supply system. Predictive methods are suitable in particular for the time delayed evaluation of recorded sensor data.

The at least one operating condition value can preferably comprise items of information on the operating conditions of the bleed air consumers, for example, the climate control and cabin pressure regulating systems. The position of shutoff valves in the pneumatic system, for example, to divide the pneumatic system into individual regions, can also be depicted by one or more operating condition values. Alternatively or additionally, the operating condition value can comprise items of information on the status of the landing gear, on the output pressure of the high-pressure compressor of an engine, or on the ambient temperature.

An operating condition value incorporated in the activation and deactivation according to the present disclosure of a monitoring module for monitoring a specific bleed air supply system can also, however, comprise the operating condition of another bleed air supply system of the aircraft. Thus, for example, in a monitoring module provided for the bleed air supply system of a main engine, items of information about the operating condition of the bleed air supply system of an auxiliary power unit (APU) or another engine can be taken into consideration in the activation and deactivation parameters.

Reference is made to the above statements for the explanation of the computer program product according to the present disclosure.

FIG. 1 schematically shows an aircraft 1, which is designed for the monitoring according to an aspect of the present disclosure of the bleed air supply systems 10 of the aircraft 1.

The aircraft 1 has two engines 2, which are each equipped with a bleed air supply system 10 comprising diverse sensors 20-22. The bleed air supply systems 10 and the sensors 20-22 are explained in more detail hereinafter on the basis of FIGS. 2 and 3.

The sensors 20-22 are connected via an aircraft-internal data bus 3 to a communication unit 4, using which data bus the sensor data of the sensors 20-22 are transmitted to a ground station 6. The operating condition monitor 5, which provides operating condition values which are also transmitted to the ground station 6, is also connected to the aircraft-internal data bus 3 and thus to the communication unit 4.

A plurality of monitoring modules 30 are arranged at the ground station 6, the functionality of which is explained in more detail hereinafter in conjunction with FIG. 3. Fault messages or other items of information can also be transmitted via the ground station 6 to the onboard computer as the operating condition monitor 5 of the aircraft 1, which displays these items of information either to the pilot in the cockpit.

Figure 2:
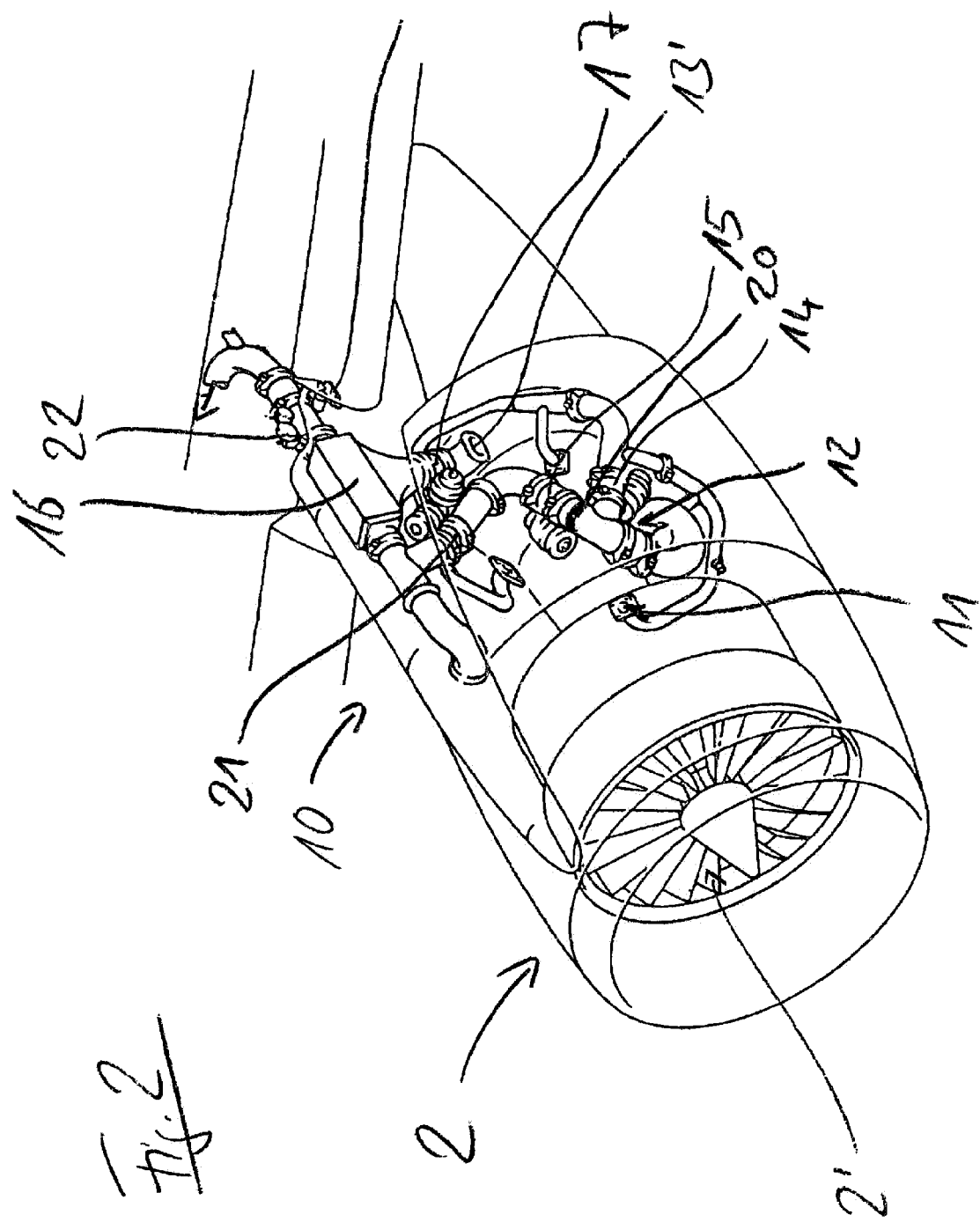
FIG. 2 shows a detail illustration of the bleed air supply system of the aircraft from FIG. 1.
Figure 3:
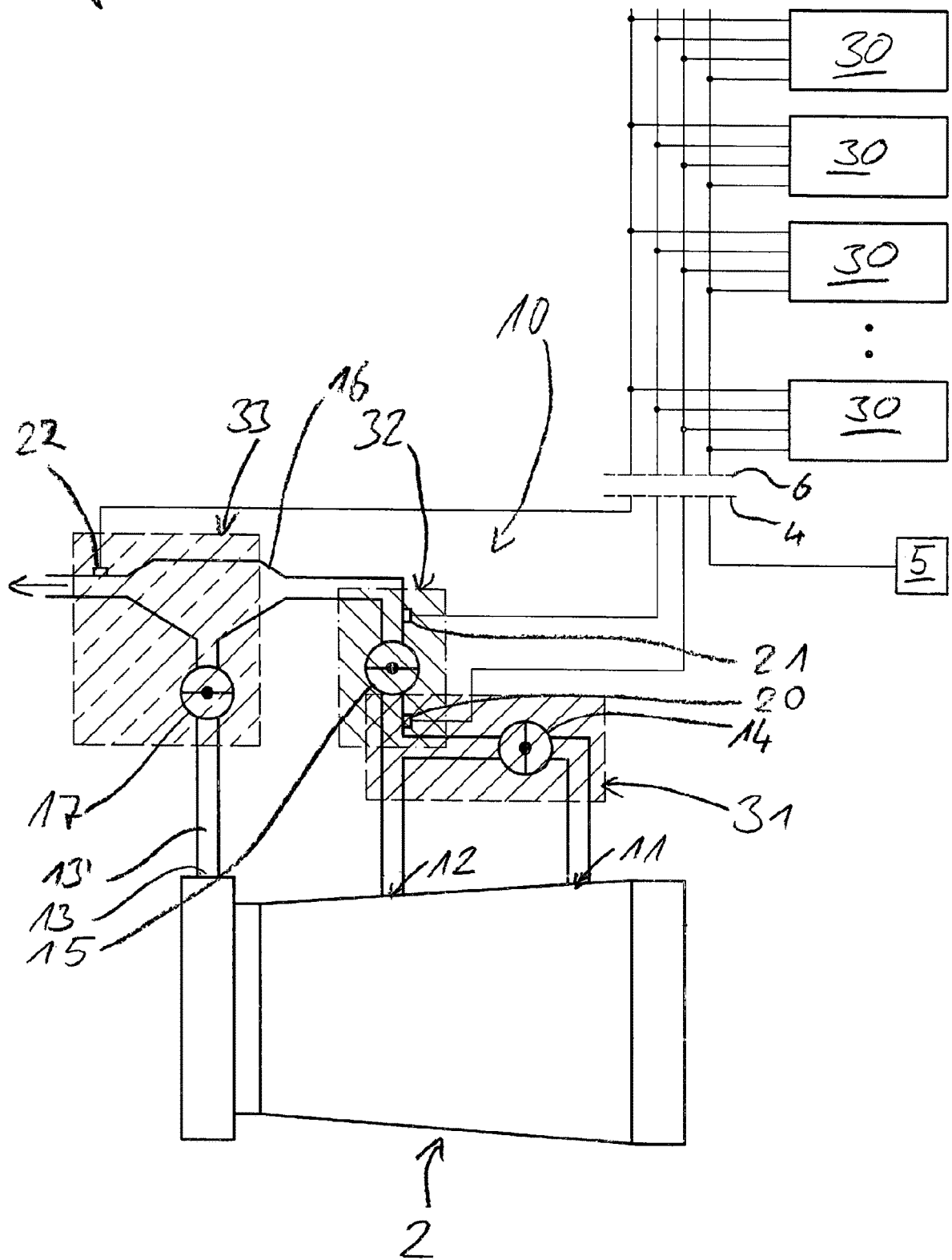
FIG. 3 shows a schematic illustration of the aircraft designed for carrying out the method according to FIG. 1.

FIG. 2 shows the bleed air supply system 10 of an engine 2 structurally in more detail, while FIG. 3 comprises a schematic functional diagram of the bleed air supply system 10.

The bleed air supply system 10 has two bleed points 11, 12 in the region of the compressor stages of the engine 2, wherein the one bleed point 11 is arranged in the region of the output of the high-pressure compressor of the engine 2, while the other bleed point 12 is arranged in a region of the engine 2 having lower pressure. In addition, another bleed point 13 is arranged in the region of the engine fan 2', via which the ambient air flowing into the engine 2, which is not or only hardly compressed, can be withdrawn. In FIG. 2, the fitting for the feed line 13' is shown.

The bleed point 11 in the region of the output of the high-pressure compressor of the engine 2 is assigned a first control valve 14, the high-pressure valve, the output of which is connected to the bleed point 12. The output point 12 and the output of the first control valve 14 are connected to a further control valve 15, the pressure regulator valve. From there, the bleed air passes through a heat exchanger 16 to the consumers or into a compressed air supply network.

The heat exchanger 16 can be supplied via the feed line 13' with cooler ambient air to cool the bleed air, which is heated due to the compression. The control valve 17 is provided in the feed line 13' for regulating the cooling airflow and thus the cooling.

The control valves 14, 15, 17 can be self-regulating valves or valves actively controlled by a control unit.

The bleed air supply system 10 is equipped with an array of sensors 20-22, at which measured values of the condition of the bleed air supply system 10 can be read. Thus, viewed in the flow direction of the bleed air, pressure sensors 20, 21 are arranged immediately before and after the pressure regulator valve 15, while a temperature sensor 22 is provided after the heat exchanger 16.

The sensor data detected by the sensors 20-22 are transmitted via the data bus 3 to the communication unit 4 and from there—together with operating condition values from the operating condition monitor 5—wirelessly to the ground station 6.

In the ground station 6, a plurality of monitoring modules 30 independent of one another is arranged, to each of which the received sensor data and operating condition values are supplied. In FIG. 3, four monitoring modules 30 are shown by way of example, although an arbitrary number of monitoring modules 30 is possible.

Each of the monitoring modules 30 has activation and deactivation parameters, the meeting of which by the received sensor data and operating condition values accordingly results in the activation or deactivation of the affected monitoring module 30. Furthermore, each monitoring module 30 comprises a monitoring function, with the aid of which the received sensor data may be monitored for possible malfunctions or faults of the bleed air supply system 10. If a fault occurs, the monitoring modules 30 can distribute corresponding fault messages.

A part of the monitoring modules 30 can also be designed for carrying out predictive methods, in which changes of the sensor data over time are evaluated with regard to imminent malfunctions. If it is recognized that a malfunction is imminent, a corresponding communication takes place, so that the bleed air supply system 10 can be serviced as far as possible before the actual occurrence of the malfunction.

The bleed air supply system 10 is logically divided into various, partially overlapping parts 31-33, wherein the monitoring modules 30 are largely only designed for monitoring one corresponding part of the bleed air supply system 10 in each case. However, multiple monitoring modules 30 can certainly be provided for the different parts of the bleed air supply system 10, which are active due to different activation and deactivation parameters in different operating conditions of the bleed air supply system 10 and/or the aircraft 1. Of course, an overlap of the monitoring by two different monitoring modules 30 is also possible here.

The ultimate monitoring by the separate monitoring modules independent of one another is explained hereinafter on the basis of examples of possible monitoring modules:

The pressure regulation by the pressure regulator valve 15 passes through different requirements during a flight, which each require different monitoring actions.

During the acceleration phase upon takeoff of the aircraft 1, in general all compressed air consumers are switched off, so that in this phase in principle no bleed air has to be taken from an engine 2 by the bleed air supply system 10, to thus provide maximum power for the thrust generation. As a result, the pressure prevailing in the compressed air supply network upon deactivation of the compressed air consumers and the bleed air supply system 10 should remain constant in this operating condition and in general should correspond to the setpoint pressure of the compressed air supply network.

The monitoring function of a monitoring module 30 for just this special operating condition of the aircraft 1 can be supported on the sensor data of the pressure sensor 21 after the pressure regulator valve 20, which in principle depicts the pressure prevailing in the compressed air supply network. An increase of the measured pressure viewed over this operating condition indicates a malfunction of the pressure regulator valve 20. Alternatively to determining the pressure curve during the operating condition in question, average and maximum pressure values for the operating condition can also be determined and compared to historic values, which were determined in the past in the same operating condition, or which are predefined as fixed dimensions. An excessive deviation indicates a fault and results in a corresponding fault message. An increase of the average pressure value viewed over time can be used for the predictive forecasting of a possible malfunction.

Diverse sensor data and operating condition values are used to determine the operating condition in question and thus to activate the associated monitoring module. To activate the monitoring module, the pressure detected via the pressure sensor 21 thus has to be in a permissible range around the setpoint pressure of the compressed air supply network, for which purpose the corresponding sensor data are used. The items of information that all compressed air consumers are deactivated, the bleed air supply system 10 is activated, and the high-pressure compressor output pressure of the engine 2 is greater than a predefined threshold value are used as operating parameters. The collective occurrence of the mentioned, solely technical operating parameters indicates the takeoff acceleration phase in question or the corresponding operating condition of the aircraft 1.

If one of the above-mentioned activation parameters is no longer met, the monitoring module 30 in question is deactivated. The deactivation parameters thus correspond to the activation parameters.

As results from the above statements, the described monitoring module 30 is thus designed for monitoring the part of the bleed air supply system 10 provided for the pressure regulation solely during the takeoff acceleration phase of the aircraft. The monitoring function of the monitoring module 30 is quite simple and thus extremely robust and reliable. A fault message of just this monitoring module 30 indicates a problem of the pressure regulator valve 15.

A further monitoring module 30, which is also designed for monitoring the part of the bleed air supply system 10 responsible for the pressure regulation, is activated when the operating condition values indicate that the landing gear of the aircraft 1 are no longer compressed (thus no longer have ground contact), at least a part of the compressed air consumers is activated, and the high-pressure compressor output pressure of the engine 2 is greater than a predefined threshold value. The data of the sensor 21 are considered as sensor data, which have to be greater than a predefined threshold value, by which it is indicated that the bleed air supply system 10 is active or is fundamentally connected to the compressed air supply network.

The activation parameters furthermore comprise a time delay parameter of 60 seconds. Since the activation parameters comprise the activation state of the compressed air consumers, after meeting the technical activation parameters, due to the generally sudden activation of the consumers, in principle transient pressure variations occur in the compressed air supply network, which are not to be taken into consideration by the monitoring module 30. In that the time delay parameter is provided, the monitoring module 30 only actually takes over the monitoring after the transient pressure variations in question have subsided.

If one of the above-mentioned activation parameters is no longer met, the monitoring module 30 in question is deactivated. The deactivation parameters thus initially correspond to the activation parameters. In addition, as a further deactivation parameter, a duration parameter is also provided, according to which the monitoring module 30 is deactivated 600 seconds after its activation, even if all activation parameters should still be met at this point in time.

The monitoring function of the monitoring module 30 can be based on the variance of the sensor data. An excessively sudden pressure change and/or a significant variation of the pressure indicates a fault of the pressure regulation of the bleed air supply system 10. The variance can also be evaluated in the course of a predictive method, wherein an increase of the variance indicates an imminent malfunction, for example, of the pressure regulator valve 15.

A further monitoring module 30 is designed for monitoring that part of the bleed air supply system 10 which regulates the high-pressure bleed air feed, thus in particular the high-pressure valve 31. The monitoring module 30 is exclusively to be active in the takeoff acceleration phase or the corresponding operating condition of the aircraft 1, for which reason the activation and deactivation parameters of this monitoring module 30 correspond to those of the monitoring module 30 for monitoring the pressure regulator valve 15 in just this takeoff acceleration phase: The pressure detected via the pressure sensor 20 has to be in a permissible range around the setpoint pressure of the compressed air supply network, all compressed air consumers have to be deactivated, the bleed air supply system 10 has to be activated and the high-pressure compressor output pressure of the engine 2 has to be greater than a predefined threshold value. The deactivation takes place with corresponding deactivation parameters, thus when one of the activation parameters is no longer met.

If it is established by the monitoring function that the pressure recorded by the pressure sensor 20 is greater than a threshold value or deviates upward by more than a predefined difference from the historic average value of this pressure sensor 20 in the operating phase in question, a fault is reported. In this case, it is a malfunction of the high-pressure valve 14. In the scope of a predictive method, the curve of the average values over the regularly repeating operating condition of the takeoff acceleration can be determined, which can indicate an imminent defect of the high-pressure valve 14.

A further monitoring module 30 is designed for monitoring those parts of the bleed air supply system 10 which regulate the high-pressure bleed air feed and also the pressure ultimately fed into the pressure supply network. The monitoring module 30 is activated when the operating condition values indicate that the landing gear of the aircraft 1 are compressed (thus have ground contact), the compressed air consumers are deactivated and the high-pressure compressor output pressure of the engine 2 is in a predefined range. The data of the sensor 21 are taken into consideration as sensor data, which have to be greater than a predefined threshold value, by which it is indicated that the bleed air supply system 10 is active or is fundamentally connected to the compressed air supply network.

The monitoring module 30 furthermore has a time delay parameter of 10 seconds as an activation parameter, and a duration parameter of 600 seconds as part of the deactivation parameters. Reference is made to the statements above for the explanation of these time-dependent parameters.

The monitoring function of the monitoring module 30 is based on the sensor data of the pressure sensors 20, 21 and checks the values for their variance and fundamental synchronization. An excessive variance or an excessive deviation in the curve of the values for the pressure indicates problems of at least one of the two control valves 14, 15 or its activation.

A further monitoring module 30 is used for monitoring the sensors 20-22. The monitoring module 30 is activated when the operating condition values indicate an altitude of greater than 6000 m, the high-pressure compressor output pressure of the engine 2 is in a predefined range, at least some compressed air consumers are activated and the difference of the measured values from the two sensors 20 or 21 is constant. The monitoring module 30 is deactivated when one of the above-mentioned activation parameters is no longer met, or the activation condition of a compressed air consumer or the difference of the measured values of the two sensors 20 or 21 changes.

The activation parameters fundamentally indicate a constant system condition, so that in this phase those sensors 20-22 which were not used for the activation as constant can be checked for a possible drift. As long as the fundamental operating condition of the compressed air system does not change, which is ensured by the deactivation parameters, the differences of the sensor data of the sensors 20-22 in question should also not change. If a change of the measured value is established in the sensor data, this indicates a problem of the affected sensor 20-22.

Arbitrary further monitoring modules 30 having individual monitoring functions and activation and deactivation parameters can be provided. The explanation by way of example above of several possible monitoring modules 30 already shows, however, that different monitoring modules 30 can be designed for condition monitoring of different, although possibly partially overlapping, parts of the bleed air supply system 10. Monitoring modules 30 which are designed for monitoring the same part of the bleed air supply system 10 can have deviating activation and deactivation parameters, so that they are fundamentally active in different operating conditions of the aircraft 1.

An overlap is also possible without problems here, in that a part of the bleed air supply system 10 is monitored simultaneously by multiple monitoring modules 30.

The results of the monitoring modules 30 can be incorporated directly into the operation of the monitored bleed air supply system 10, in that, for example, a warning is output to the pilot and/or the bleed air supply system 10—if the bleed air supply is ensured in another way—is immediately deactivated, or they are used for the service of the bleed air supply system 10 to be able to carry out targeted service.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for monitoring a bleed air supply system of an aircraft, the bleed air supply system comprising:
   at least one sensor for condition monitoring of the bleed air supply system based on obtained sensor data,
   at least one operating condition monitor for detecting an operating condition of a different portion of the aircraft than the bleed air supply system based on at least one operating condition value, and
   at least two independent monitoring modules for evaluating a condition of at least a part of the bleed air supply system, wherein for each of the monitoring modules, an individual monitoring function, an individual activation parameter, and an individual deactivation parameter based on the obtained sensor data of the at least one sensor and the at least one operating condition value are provided,
the method comprising:
   detecting the condition of the bleed air supply system based on the sensor data and the operating condition of the aircraft;
   activating a monitoring module of the at least two independent monitoring modules when the individual activation parameter is met by the sensor data and the at least one operating condition value, wherein the monitoring module is configured to compare the detected sensor data to historic values, the historic values having been determined in the past in a same operating condition, wherein the historic values comprise historic sensor data, and wherein the monitoring module is configured to compare the detected sensor data to the historic sensor data recorded during preceding activations of the monitoring module;
   monitoring the condition of the bleed air supply system using the activated monitoring module of the at least two independent monitoring modules, the activated monitoring module comprising a monitoring function that performs a predictive method indicating a fault of the bleed air supply system is imminent; and
   deactivating the activated monitoring module when the individual deactivation parameter is met by the sensor data and the at least one operating condition value.

2. The method as claimed in claim 1, wherein one of the at least two independent monitoring modules is configured to evaluate the condition of the part of the bleed air supply system, the condition of which is not evaluated by another one of the at least two independent monitoring modules.

3. The method as claimed in claim 1, wherein the at least two independent monitoring modules comprise three monitoring modules, of which two monitoring modules are configured for condition monitoring of at least partially overlapping parts of the bleed air supply system, but have deviating activation and deactivation parameters.

4. The method as claimed in claim 1, wherein the individual deactivation parameter of the monitoring module correspond to its activation parameters.

5. The method as claimed in claim 1, wherein the individual activation parameter of the monitoring module comprise a time delay parameter to activate the monitoring module only after a predefined time after the activation parameters are met.

6. The method as claimed in claim 1, wherein the individual deactivation parameter of the monitoring module comprises a duration parameter to deactivate the monitoring module after passage of a predefined duration after its activation.

7. The method as claimed in 1, wherein the monitoring module is configured to determine minimum, maximum, average, and/or variance values of the sensor data of the at least one sensor over an activation time period between activation and subsequent deactivation.

8. The method as claimed in claim 1, wherein the monitoring module is configured to monitor at least one part of the sensors.

9. The method as claimed in claim 1, wherein the monitoring module is further configured to carry out output warnings.

10. The method as claimed in claim 1, wherein the at least one operating condition value comprises items of information on the operating conditions of the bleed air consumers, the status of the landing gear, the output pressure of the high-pressure compressor of an engine, and/or the ambient temperature.

11. A non-transitory computer readable storage medium comprising a computer program product or set of computer program products comprising program parts which, when loaded in a computer or in computers networked with one another, are configured to carry out the method as claimed in claim 1.

12. A bleed air supply system of an aircraft, the bleed air supply system comprising:
   at least one sensor configured to monitor a condition of the bleed air supply system based on sensor data obtained by the at least one sensor;
   at least one operating condition monitor configured to detect, based on at least one operating condition value, an operating condition of a different portion of the aircraft than the bleed air supply system via; and
   at least two independent monitoring modules each comprising an individual activation parameter, an individual deactivation parameter based on the sensor data and the at least one operating condition value, and an individual monitoring function configured to evaluate a condition of at least a part of the bleed air supply system and configured to perform a predictive method indicating a fault of the bleed air supply system is imminent, wherein each of the at least two independent monitoring modules are configured to:
   activate based on the sensor data and the at least one operating condition value satisfying the individual activation parameter;
   monitor, using the individual monitoring function, the condition of the bleed air supply system based on comparing the detected sensor data to historic values, the historic values having been determined in the past in a same operating condition, wherein the historic values comprise historic sensor data, and wherein the monitoring module is configured to compare the detected sensor data, and wherein the monitoring module is configured to compare the detected sensor data to the historic sensor data recorded during preceding activations of the monitoring module; and deactivate based on the sensor data and the at least one operating condition value satisfying the individual deactivation parameter.

13. The system of claim 12, wherein the bleed air supply system further comprises a pressure valve system and a temperature regulation system, and wherein at least two monitoring modules further comprise:

a pressure valve monitoring module configured to monitor the pressure valve system; and a temperature regulation monitoring module configured to monitor the temperature regulation system.

14. The method as claimed in claim 1, wherein the predictive method indicates the fault of the bleed air supply system is imminent before an actual fault of the bleed air supply system occurs.

* * * * *

UNITED STATES PATENT AND TRADEMARK OFFICE
CERTIFICATE OF CORRECTION

PATENT NO. : 12,337,999 B2  
APPLICATION NO. : 17/789800  
DATED : June 24, 2025  
INVENTOR(S) : Alexej Demeschkin Page 1 of 1

It is certified that error appears in the above-identified patent and that said Letters Patent is hereby corrected as shown below:

In the Claims

Column 14 and Column 15 Claim 12, Lines 66-67 and 1-6, the phrase "... , wherein the historic values comprise historic sensor data, and wherein the monitoring module is configured to compare the detected sensor data, and wherein the monitoring module is configured to compare the detected sensor data to the historic sensor data recorded during preceding activations of the monitoring module" should read
".... , wherein the historic values comprise historic sensor data, and wherein the monitoring module is configured to compare the detected sensor data to the historic sensor data recorded during preceding activations of the monitoring module;...".

Signed and Sealed this  
Twenty-fifth Day of November, 2025

John A. Squires  
*Director of the United States Patent and Trademark Office*